United States Patent
Rodrigues et al.

(10) Patent No.: US 6,306,815 B1
(45) Date of Patent: Oct. 23, 2001

(54) QUATERNARY POLYVINYLPYRRIDINIUM DERIVATIVES AS ANTI-DYE TRANSFER AGENTS

(75) Inventors: Klein A. Rodrigues, Signal Mountain, TN (US); John S. Thomaides, Berkeley Heights, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/393,117

(22) Filed: Sep. 10, 1999

(51) Int. Cl.$^7$ .................................................. C11D 3/37
(52) U.S. Cl. .................................................. 510/475
(58) Field of Search ...................... 510/475, 476

(56) References Cited

U.S. PATENT DOCUMENTS

| | | | |
|---|---|---|---|
| 5,458,809 | 10/1995 | Fredj et al. | 252/542 |
| 5,460,752 | 10/1995 | Fredj et al. | 252/542 |
| 5,466,802 | 11/1995 | Panandiker et al. | 544/193.2 |
| 5,627,151 | 5/1997 | Detering et al. | 510/475 |
| 5,776,879 | 7/1998 | Shih et al. | 510/361 |

FOREIGN PATENT DOCUMENTS

| | | | |
|---|---|---|---|
| 2814287 | 10/1979 | (DE) | C11D/3/28 |
| 4027832 | 3/1992 | (DE) | C11D/17/08 |
| 209337 * | 1/1987 | (EP) . | |
| 0327927 | 8/1989 | (EP) | C11D/3/37 |
| 0372291 | 6/1990 | (EP) | C11D/3/37 |
| 0754748 | 1/1997 | (EP) | C11D/3/00 |
| 58-13700 * | 1/1983 | (JP) . | |
| 61-47800 * | 3/1986 | (JP) . | |
| 2-80664 * | 3/1990 | (JP) . | |
| WO 95/03390 | 2/1995 | (WO) | C11D/3/37 |
| WO 95/27038 | 10/1995 | (WO) | C11D/17/00 |

* cited by examiner

Primary Examiner—John Hardee
(74) Attorney, Agent, or Firm—Thomas F. Roland

(57) ABSTRACT

A water-soluble quaternary polyvinylpyrridinium derivative which inhibits dye transfer in detergent compositions without adversely affecting stain or soil removal or soil redeposition. The quaternary polyvinylpyrridinium derivative contains a quaternary nitrogen and an anionic moiety selected from a sulfonate and/or a carboxylate functionality, said quaternary polyvinylpyrridinium derivative having the structure

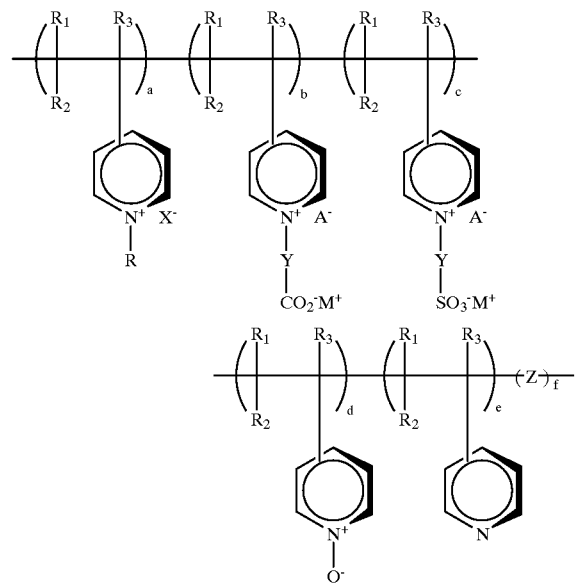

1 Claim, No Drawings

QUATERNARY POLYVINYLPYRRIDINIUM DERIVATIVES AS ANTI-DYE TRANSFER AGENTS

FIELD OF THE INVENTION

This invention relates to water-soluble quaternary polyvinylpyrridinium derivatives containing a quaternary nitrogen. The quaternary polyvinylpyrridinium derivatives are useful as anti-dye transfer and color protection agents in detergent compositions, especially detergent compositions containing a high level of anionic surfactants.

BACKGROUND OF THE INVENTION

One of the most persistent and troublesome problems arising during modern fabric laundering operations is the tendency of some colored fabrics to release dye into the laundering solutions. The dye is then transferred onto other fabrics being washed therewith.

One way of overcoming this problem would be to complex or adsorb the fugitive dyes washed out of dyed fabrics before they have the opportunity to become attached to other articles in the wash. Polyvinylpyrrolidone, by virtue of its dye complexation ability, has been used to inhibit dye deposition during washing of colored fabrics under laundry conditions. The performance of polyvinylpyrrolidone as a dye transfer inhibitor, however, is adversely affected by the presence of high levels of anionic surfactants in the washing process.

Other polymers which have been used in detergent compositions to inhibit dye transfer include polyvinylimidazole, polyvinylpyridine N-oxide, polyvinylimidazole and copolymers of polyvinylpyridine and polyvinylimidazole. DE 2 814 287-A describes detergent compositions containing N-vinyl imidazole homo- or copolymer in combination with anionic and/or nonionic surfactants and other detergent ingredients. WO 95/03390 describes dye inhibiting polymers of polyvinylpyrrolidone, polyamine N-oxide, and vinylimidazole. U.S. Pat. No. 5,460,752 describes polyamine N-oxide polymers.

U.S. Pat. No. 5,627,151 describes copolymers of vinylpyrrolidone or vinylimidazole, vinylpyridine or dimethylaminoethyl methacrylate or dimethylaminopropylmethacrylamide, including up to 20% vinylacetate, for use in laundry detergents. U.S. Pat. No. 5,466,802 describes poly(4-vinylpyridine-N-oxide) and copolymers of vinylpyrrolidone and vinylimidazole. EP 754748 describes vinylpyridine copolymers and formic acid. U.S. Pat. No. 5,458,809 describes poly(4-vinylpyridine-N-oxide). WO 95/27038 describes poly(4-vinylpyridine-N-oxide), polyvinylpyrrolidone, polyvinylpyrrolidone-vinylimidazole and copolymers of vinylpyrrolidone and vinylimidazole.

EP 372 291 describes a process for washing discoloration-sensitive textiles. The wash liquor contains anionic/nonionic surfactants and water-soluble polymers, for example, copolymers N-vinylimidazole, N-vinyloxazolidone or N-vinylpyrrolidone. EP 327 927 describes a granular detergent additive comprising water-soluble polymeric compounds based on N-vinylpyrrolidone and/or N-vinylimidazole and/or N-vinyloxazolidone and cationic compounds. DE 4027832 describes electrolyte-free liquid detergent compositions comprising zeolite A, nonionic surfactants and homo- and copolymers selected from N-vinylpyrrolidone and/or N-vinylimidazole and/or N-vinyloxazolidone. U.S. Pat. No. 5,776,879 describes water-soluble poly(vinylpyridine betaines) containing a quaternary nitrogen and a carboxylate salt, which have effective dye transfer inhibitor properties. U.S. patent application Ser. No. 09/300,913, filed Apr. 28, 1999, describes polyvinylpyrridinium derivatives containing a quaternary nitrogen and an anionic moiety selected from a sulfonate or a carboxylate functionality, for use in detergent compositions.

It would be advantageous to develop a polymer which provides anti-dye transfer and color protection properties to detergent compositions having a high level of anionic surfactants. The polymer should also provide anti-dye transfer and color protection properties without adversely affecting stain or soil removal or soil redeposition. In addition, the polymer should be effective on a broad range of dyes present in the wash water.

SUMMARY OF THE INVENTION

The invention provides a water-soluble quaternary polyvinylpyrridinium derivative comprising a quaternary nitrogen. The quaternary polyvinylpyrridinium derivative has the structure:

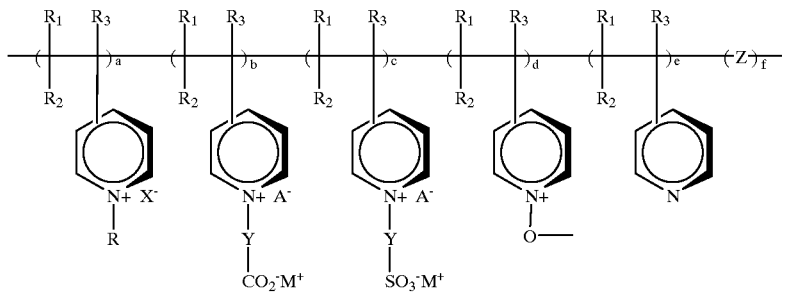

wherein a, b, c, d, e, and f represent the mole percent of the respective repeating unit, a is 1 to 100, b is 0 to 99, c is 0 to 99, d is 0 to 99, e is 0 to 99; f is 0 to 99; R is selected from the group consisting of substituted or unsubstituted $C_1$–$C_{18}$ alkyl, $C_1$–$C_{18}$ alkenyl, $C_1$–$C_{18}$, alkoxy, $C_1$–$C_{18}$ aryl, and benzyl; $R_1$, $R_2$, and $R_3$, are independently selected from the group consisting of hydrogen, hydroxyl, alkyl having $C_1$ to $C_{18}$, aryl having $C_6$ to $C_{18}$, and alkaryl having $C_7$ to $C_{18}$; Y is independently selected from the group consisting of $(CR_4R_5)_{m_1}$, benzene, and substituted benzene, wherein substituted benzene is independently a benzene substituted with a group selected from the group consisting of amino, nitro, halogen, and combinations thereof; $R_4$ and $R_5$ are independently H or OH; $m_1$ is 0 to 10; Z is the residue of an ethylenically unsaturated monomer; $M^+$ is independently a cation wherein M is selected from the group consisting of hydrogen, ammonia, alkali metals, alkaline earth metals, zinc, copper, organic amines, amino acids, and amino saccharides; $X^-$ is independently a halide; and $A^-$ is independently a halide, provided that $A^-$ is present when $M^+$ is present.

The quaternary polyvinylpyrridinium derivatives of the invention inhibit dye transfer in detergent compositions having a high level of anionic surfactants. The polymer also provides anti-dye transfer and color protection properties without adversely affecting stain or soil removal or soil redeposition. In addition, the polymer is effective on a broad range of dyes present in the wash water.

The present inventors believe that the quaternary polyvinylpyrridinium derivative of the invention inhibits dye transfer in laundering or washing processes containing the detergent composition by hydrogen bonding with dyes or through dipole-dipole interaction or electrostatic interaction with dyes which are present in wash water.

DESCRIPTION OF THE INVENTION

In accordance with the invention, the water-soluble quaternary polyvinylpyrridinium derivative comprises a quaternary nitrogen. The quaternary polyvinylpyrridinium derivative has the general structure:

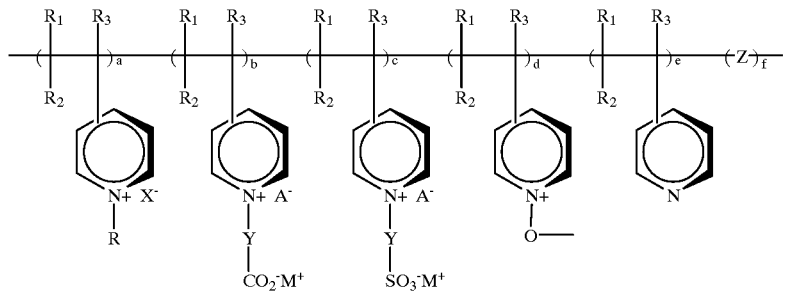

wherein a, b, c, d, e, and f represent the mole percent of the respective repeating unit, a is 1 to 100, b is 0 to 99, c is 0 to 99, d is 0 to 99, e is 0 to 99; f is 0 to 99; R is selected from the group consisting of substituted or unsubstituted $C_1$–$C_{18}$ alkyl, $C_1$–$C_{18}$ alkenyl, $C_1$–$C_{18}$ alkoxy, $C_1$–$C_{18}$ aryl, and benzyl; $R_1$, $R_2$, and $R_3$, are independently selected from the group consisting of hydrogen, hydroxyl, alkyl having $C_1$ to $C_{18}$, aryl having $C_6$ to $C_{18}$, and alkaryl having $C_7$ to $C_{18}$; Y is independently selected from the group consisting of $(CR_4R_5)_{m1}$, benzene, and substituted benzene, wherein substituted benzene is independently a benzene substituted with a group selected from the group consisting of amino, nitro, halogen, and combinations thereof; $R_4$ and $R_5$ are independently hydrogen or hydroxyl; $m_1$ is 0 to 10; Z is the residue of an ethylenically unsaturated monomer; $M^+$ is independently a cation wherein M is selected from the group consisting of hydrogen, ammonia, alkali metals, alkaline earth metals, zinc, copper, organic amines, amino acids, and amino saccharides; $X^-$ is independently a halide; and $A^-$ is independently a halide, provided that $A^-$ is present when $M^+$ is present.

In a preferred embodiment of the quaternary polyvinylpyrridinium derivative, a is 50 to 100, b is 0 to 50, c is 0 to 50, d is 0 to 50, e is 0 to 50, and f is 0 to 50, more preferably a is 50 to 100, b is 0 to 10, c is 0 to 10, d is 0 to 10, e is 0 to 10, and f is 0 to 10. Preferably R is selected from $C_1$–$C_{18}$, alkyl, $C_1$–$C_{18}$, alkenyl, or benzyl. Preferably $R_1$, $R_2$, and $R_3$, are independently selected from hydrogen, hydroxyl or methyl. Preferably Y is independently selected from $(CR_4R_5)_{m1}$, or benzene. Preferably $m_1$ is 1 to 6. Preferably Z is the residue of an anionic ethylenically unsaturated monomer. Preferably $M^+$ is independently a cation wherein M is sodium or potassium. Preferably $X^-$ is independently fluoride, chloride, iodide, or bromide, more preferably chloride. Preferably $A^-$ is independently fluoride, chloride, iodide, or bromide, more preferably chloride, It is within the scope of the invention that $M^+$ and $A^-$ may not be present in the quaternary polyvinylpyrridinium derivative of the invention. $A^-$ is present when $M^+$ is present. Similarly, $M^+$ is present when $A^-$ is present.

The letter Z represents the residue of an ethylenically unsaturated monomer. Any ethylenically unsaturated monomer may be used. Such monomers are known to those skilled in the art. A combination of ethylenically unsaturated monomers may also be used.

In one embodiment of the invention, the ethylenically unsaturated monomers have an anionic charge or become anionic upon treatment with a base. While not wishing to be bound by any particular theory, the inventors believe that the anionic charge minimizes interaction of the polymers of the invention with anionic surfactants present in the detergent compositions. Examples of such monomers are acrylic acid, 2-acrylamido-2-methyl propane sulfonic acid, sodium methallyl sufonate, sodium vinyl sulfonate, sulfonated styrene, allyloxybenzene sulfonic acid, methacrylic acid, ethacrylic acid, alpha-chloro-acrylic acid, alpha-cyano acrylic acid, alpha-chloro-acrylic acid, alpha-cyano acrylic acid, beta methyl-acrylic acid (crotonic acid), alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, and tricarboxy ethylene.

In one embodiment of the invention, the ethylenically unsaturated monomers are nonionic nitrogen containing monomers. Examples of such monomers are acrylamide, N, N-dimethylacrylamide, N-octyl acrylamide, N-methylol acrylamide, dimethylaminoethylacrylate, vinyl pyrrolidone, vinyl imidazolidone, N-vinyl formamide, N-vinyl acetamide, dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, dimethylaminobutyl methacrylate, dimethylaminoneopentyl acrylate, dimethylaminoneopentyl methacrylate, dimethylaminoethylacrylamide, dimethylaminoethylmethacrylamide, diethylaminoethylacrylamide, diethylaminoethylmethacrylamide, dipropylaminoethylacrylamide, dipropylaminoethylmethacrylamide, dimethylaminopropylacrylamide, dimethylaminopropylmethacrylamide, diethylaminopropylacrylamide, diethylaminopropylmethacrylamide, dimethylaminoneopentylacrylamide, dimethylaminoneopentylmethacrylamide and dialkylaminobutylacrylamide.

In one embodiment of the invention, the water-soluble quaternary polyvinylpyrridinium derivatives of the invention are made by polymerizing a vinylpyridine under suitable polymerization conditions to form a poly(vinylpyridine) intermediate, and then reacting the poly(vinylpyridine) intermediate with a quaternizing agent. The reaction product is a quaternary polyvinylpyrridinium derivative containing a quaternary nitrogen.

In one embodiment of the invention, the water-soluble quaternary polyvinylpyrridinium derivatives of the invention are made by reacting a vinylpyridine monomer with a suitable quaternary reagent to form a quaternized vinylpyrridinium monomer, and then polymerizing the quaternized vinylpyrridinium monomer to form a quaternary polyvinylpyrridinium derivative containing a quaternary nitrogen.

In one embodiment of the invention, unfunctionalized pyridine groups in the quaternary polyvinylpyrridinium derivative are further reacted to the corresponding betaine (repeating unit b and c), or amine oxide (repeating unit d), or left as is (repeating unit e). Optionally another monomer (repeating unit f) may be incorporated into the quaternary polyvinylpyrridinium derivative.

In one embodiment of the invention, vinyl pyridine is polymerized in an alcohol water mixture and then reacted to form the corresponding quaternary polyvinylpyrridinium derivative. A small amount of base is added to the reaction mixture, alcohol is distilled off to produce a water soluble product. It is important to note, however, that nonwater-soluble monomers may be used to prepare the quaternary polyvinylpyrridinium derivative. Although the reaction proceeds without a catalyst, a catalyst may be employed to speed up the reaction. Suitable catalysts are known to those skilled in the art.

In one embodiment, the quaternary polyvinylpyrridinium derivative is used in a fabric softening composition. The level of the quaternary polyvinylpyrridinium derivative in the fabric softening compositions is from about 0.01 to about 90 weight percent, more preferably from about 0.05 to about 20 percent, most preferably from about 0.1 to about 10 weight percent, based on the total weight of the fabric softening composition.

In one embodiment, the quaternary polyvinylpyrridinium derivative is used in detergent compositions. The level of the quaternary polyvinylpyrridinium derivative in the detergent compositions is from about 0.01 to about 90 weight percent, more preferably from about 0.05 to about 20 percent, most preferably from about 0.1 to about 10 weight percent, based on the total weight of the detergent composition.

While not wishing to be bound by any particular theory, the present inventors believe that the quaternary polyvinylpyrridinium derivative of the invention inhibits dye transfer in laundering or washing processes containing the detergent composition by hydrogen bonding with dyes or through dipole-dipole interaction or electrostatic interaction with dyes which are present in wash water. The laundering or washing process is preferably carried out at about 5° C. to about 75° C., more preferably, from about 20° C. to about 60° C.

The detergent composition may be a solid or liquid composition. If the detergent composition is solid, the detergent composition may be in any of the usual physical forms, such as for example, powders, beads, flakes, bars, tablets, noodles, pastes, and slurries. If the detergent composition is liquid, the detergent composition preferably disperses or solubilizes the quaternary polyvinylpyrridinium derivative. The detergent composition may be aqueous or nonaqueous. For example, the quaternary polyvinylpyrridinium derivative may be dissolved or dispersed in water, in one or more solvents or inert diluents. Preferably the detergent composition is aqueous.

The detergent compositions may contain any additional components which are used in detergent compositions. Such additional components are well known to those skilled in the art and include one or more surfactants, builders, ion exchangers, alkalies, anticorrosion materials, antiredeposition materials, optical brighteners, fragrances, dyes, chelating agents, enzymes, whiteners, brighteners, antistatic agents, sudsing control agents, solvents, hydrotropes, bleaching agents, perfumes, bleach precursors, water, buffering agents, soil removal agents, soil release agents, softening agents, opacifiers, inert diluents, buffering agents, corrosion inhibitors, graying inhibitors, and stabilizers. Combinations of such additional components may also be used.

Suitable surfactants are nonionic, anionic, cationic, ampholytic, zwitterionic and semi-polar surfactants. A combination of surfactants may also be used.

Anionic surfactants include, for example, from $C_8$ to $C_{20}$ alkylbenzenesulfonates, from $C_8$ to $C_{20}$ alkanesulfonates, from $C_8$ to $C_{20}$ alkylsulfates, from $C_8$ to $C_{20}$ alkylsulfosuccinates or from $C_8$ to $C_{20}$ sulfated ethoxylated alkanols.

Nonionic surfactants include, for example, from $C_6$ to $C_{12}$ alkylphenol ethoxylates, from $C_8$ to $C_{20}$ alkanol alkoxylates, and block copolymers of ethylene oxide and propylene oxide. Optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. The nonionic surfactants also include $C_4$ to $C_{18}$ alkyl glucosides as well as the alkoxylated products obtainable therefrom by alkoxylation, particularly those obtainable by reaction of alkyl glucosides with ethylene oxide.

Cationic surfactants contain hydrophilic functional groups where the charge of the functional groups are positive when dissolved or dispersed in an aqueous solution. Typical cationic surfactants include, for example, amine compounds, oxygen containing amines, and quaternary amine salts.

Amphoteric surfactants contain both acidic and basic hydrophilic groups. Amphoteric surfactants are preferably derivatives of secondary and tertiary amines, derivatives of quaternary ammonium, quaternary phosphonium or tertiary sulfonium compounds. The cationic atom in the quaternary compound can be part of a heterocyclic ring. The amphoteric surfactant preferably contains at least one aliphatic group, containing about 3 to about 18 carbon atoms. At least one aliphatic group preferably contains an anionic water-solubilizing group such as a carboxy, sulfonate, or phosphono.

Generally, anionic surfactants, such as linear alkyl sulfonates (LAS) are preferred for use in solid detergent compositions containing the quaternary polyvinylpyrridinium derivative. Nonionic and anionic surfactant mixtures such as alcohol ethoxylates and LAS are preferred in liquid detergent compositions containing the quaternary polyvinylpyrridinium derivative. The surfactants are optionally present in an amount of from about 0 to about 50 weight percent, preferably from about 2 to about 45 weight percent, and more preferably from about 5 to about 40 weight percent, based on the total weight of the detergent composition.

Examples of bleaching agents are perborates, percarbonates, or chlorine-generating substances such as chloroisocyanurates. Examples of silicates used as corrosion inhibitors are sodium silicate, sodium disilicate, and sodium metasilicate. Examples of graying inhibitors are carboxymethylcellulose, methylcellulose, hydroxypropylmethyl-cellulose, and polyacrylic acid and copolymers of acrylic and maleic acid.

Examples of enzymes are proteases, amylases, lipases, cellulases, and peroxidases, as well as mixtures thereof. Other types of enzymes may also be included. They may be of any suitable origin, such as vegetable, animal, bacterial, fungal and yeast origin.

Any conventional builder system is suitable for use in the detergent composition including aluminosilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable builders can be an inorganic ion exchange material, commonly an inorganic hydrated aluminosilicate material, more particularly a hydrated synthetic zeolite such as hydrated zeolite A, X, B or HS. Another suitable inorganic builder material is layered silicate, e.g., SKS-6 (Hoechst). SKS-6 is a crystalline layered silicate consisting of sodium silicate ($Na_2Si_2O_5$). The preferred polycarboxylates are hydroxycarboxylates containing up to three carboxy groups per molecule, more particularly citrates.

Preferred builder systems for use in the detergent compositions include a mixture of a water-insoluble aluminosilicate builder such as zeolite A or of a layered silicate (SKS/6), and a water-soluble carboxylate chelating agent such as citric acid.

A suitable chelant for inclusion in the detergent compositions is ethylenediamine-N,N'-disuccinic acid (EDDS) or the alkali metal, alkaline earth metal, ammonium, or substituted ammonium salts thereof, or mixtures thereof.

Examples of suds suppressors are silicones and silica-silicone mixtures. Silicones can be generally represented by alkylated polysiloxane materials while silica is normally used in finely divided forms exemplified by silica aerogels and xerogels and hydrophobic silicas of various types.

Examples of antiredeposition and soil suspension agents are cellulose derivatives such as methylcellulose, carboxymethylcellulose and hydroxyethylcellulose, and homopolymers of acrylic acid and copolymers of maleic acid and acrylic acid.

Examples of optical brighteners are disodium $4,4^1$-bis-(2-diethanolamino-4-anilino-s-triazin-6-ylamino)stilbene-$2:2^1$disulphonate, disodium $4,-4^1$-bis-(2-morpholino-4-anilino-s-triazin-6-ylaminostilbene-$2:2^1$-disulphonate, disodium $4,4^1$-bis-(2,4-dianilino-s-triazin-6-ylamino)stilbene-$2:2^1$-disulphonate, monosodium $4^1,4^{11}$-bis-(2,4-dianilino-s-triazin-6ylamino)stilbene-2-sulphonate, disodium $4,4^1$-bis-(2-anilino-4-(N-methyl-N-2-hydroxyethylamino)-s-triazin-6-ylamino)stilbene-$2,2^1$-disulphonate disodium $4,4^1$-bis-(4-phenyl-2,1,3-triazol-2-yl)-stilbene-$2,2^1$disulphonate, disodium $4,4^1$-bis(2-anilino-4-(1-methyl-2-hydroxyethylamino)-s-triazin-6-ylamino) stilbene-$2,2^1$disulphonate, and sodium 2(stilbyl-$4^{11}$-(naphtho-$1^1,2^1$:4,5)-1,2,3-triazole-$2^{11}$-sulphonate.

Other useful polymeric materials which may be added to the detergent compositions are polyethylene glycols, particularly those of molecular weight 1000–10000, more particularly 2000 to 8000 and most preferably about 4000. These optional polymeric materials including the previously mentioned homo- or copolymeric polycarboxylate salts are valuable for improving whiteness maintenance, fabric ash deposition, and cleaning performance on clay, proteinaceous and oxidizable soils in the presence of transition metal impurities.

Examples of soil release agents are conventional copolymers or terpolymers of terephthalic acid with ethylene glycol and/or propylene glycol units in various arrangements, as well as the ethoxylated/propoxylated polyamines. Modified polyesters may also be used as soil release agents, and include random copolymers of dimethyl terephtalate, dimethyl sulfoisophtalate, ethylene glycol and 1–2 propane diol, the end groups consisting primarily of sulphobenzoate and secondarily of mono esters of ethylene glycol and/or propane-diol.

The following nonlimiting examples illustrate further aspects of the invention.

EXAMPLE 1

A sample of poly(4 vinyl-1-methyl-pyridinium bromide) (20% solution in water) was obtained from PolySciences Inc, Warrington Pa. This polymer was evaluated in the anti-dye transfer test described below.

The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 1.3 g/l of commercial Wisk liquid detergent and 1 weight percent polymer based on the weight of the detergent. The test was conducted at 93.4° F., 80 rpm and 110 PPM hardness water. The wash was 20 minutes and was followed by a 3 minute rinse. The swatches were then dried and the L values (whiteness) of the white swatches were measured using a Hunter colorimeter. A higher L value for the white swatch indicates that less dye is being transferred to the swatch and is a measure of the effectiveness of the dye transfer polymer. The test results are summarized in Table I.

TABLE 1

| Evaluation of dye transfer properties. | | |
| --- | --- | --- |
| Commercial liquid detergent composition | Quaternary polyvinylpyrridinium derivative | L value of white swatch |
| Wisk | None | 77.6 |
| Wisk | poly(4 vinyl-1-methyl-pyridinium bromide) | 84.5 |

The results in Table I show that colored swatches washed in the detergent compositions containing the quaternary polyvinylpyrridinium derivative of this invention were significantly whiter, as determined by the higher L values, than the swatches washed in the detergents without the polymer of the invention. Thus, the quaternary polyvinylpyrridinium derivatives prevent dyes which are present in the wash water from depositing on clothing.

EXAMPLE 2

Determination of whether the quaternary polyvinylpyrridinium derivatives such as the poly(4 vinyl-1-methylpyridinium bromide) of Example 1 affect stain removal in a detergent composition.

A primary detergency test was conducted using a Blood/Milk/Ink (BMI) stain that was obtained from Test Fabrics. The test consisted on washing a BMI obtained swatch with 5 white swatches as ballast. These swatches are commercially available from Test Fabrics in New Jersey. The test was conducted in a terg-o-tometer using 1.9 g/l of commercially available Arm and Hammer powder or 1.3 g/l of commercially available liquid Wisk and 1.0 wt. Polymer based on weight of detergent. The test was conducted at 93° F., 80 rpm and 110 PPM hardness water. The wash was 20 minutes and was followed by a 3 minute rinse. The swatches were then dried and the L values of the BMI swatches were measured using a Hunter calorimeter. Higher L values for the BMI swatches indicate better detergency and that the stain is not being held on. The test results are summarized in Table II.

TABLE II

Evaluation of primary detergency properties.

| Polymer or Copolymer | in Commercial detergent | L value of white swatch primary detergency | L value of BMI swatch in primary detergency |
|---|---|---|---|
| None | Arm and Hammer powder | 61.0 | 92.7 |
| poly(4 vinyl-1-methyl-pyridinium bromide) | Arm and Hammer powder | 61.0 | 92.1 |
| None | Wisk liquid | 63.9 | 93.1 |
| poly(4 vinyl-1-methyl-pyridinium bromide) | poly(4 vinyl-1-methyl-pyridinium bromide) | 63.4 | 93.0 |

The test results in Table II show that the quaternary polyvinylpyrridinium derivative of Example 1 does not adversely affect stain removal since the L value of the BMI swatch in the presence of the polymer is approximately the same as that of the control. Furthermore, the L values of the white swatch indicate that the polymer and copolymer do not have an adverse effect on anti-redeposition properties since L value of the white swatch in the presence of the polymer is approximately the same as that of the control.

EXAMPLE 3

Synthesis of poly(4 vinyl-1-ethyl-pyridinium bromide) 3.5 grams of poly(4-vinyl pyridine), 0.0476 mol, having a molecular weight of 50,000 (obtained from Polysciences, Inc.) was dissolved in 100.0 grams of isopropanol. The mixture was heated to 60° C. in a reactor to dissolve the polymer. A solution of 3.63 grams of ethyl bromide was added to the reactor. The mixture was heated to 80° C. and held at that temperature for 20 hours. 75 grams of deionized water was then added to the dark brown reaction mixture. The isopropanol was distilled off by raising the temperature to 100° C. After cooling, the product was a clear light brown solution with no undissolved solids.

EXAMPLE 4

A sample of poly(4 vinyl-1-ethyl-pyridinium bromide) synthesized in Example 3 was evaluated in the anti-dye transfer test described below. The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 1.3 g/l of Wisk liquid detergent and 1 weight percent polymer based on the weight of the detergent. The test was conducted at 93.4° F., 80 rpm and 110 PPM hardness water. The wash was 20 minutes and was followed by a 3 minute rinse. The swatches were then dried and the L values (whiteness) of the white swatches were measured using a Hunter calorimeter. A higher L value for the white swatch indicates that less dye is being transferred to the swatch and is a measure of the effectiveness of the dye transfer polymer. The test results are summarized in Table III.

TABLE III

Evaluation of dye transfer properties.

| Commercial liquid detergent composition | Quaternary polyvinylpyrridinium derivative | L value of white swatch |
|---|---|---|
| Wisk | None | 77.9 |
| Wisk | poly(4 vinyl-1-ethyl-pyridinium bromide) | 86.5 |

The results in Table III show that colored swatches washed in the detergent compositions containing the quaternary polyvinylpyrridinium derivative prepared in Example 3 were significantly whiter, as determined by the higher L values, than the swatches washed in the detergents without the polymer of the invention. Thus, the quaternary polyvinylpyrridinium derivatives prevent dyes which are present in the wash water from depositing on clothing.

EXAMPLE 5

Determination of whether the quaternary polyvinylpyrridinium derivatives such as the poly(4 vinyl-1-ethyl-pyridinium bromide) of Example 3 affect stain removal in a detergent composition.

A primary detergency test was conducted using a series of stains that ware obtained from Test Fabrics. The test consisted on 3 swatches each stained with Grass, tea, red wine and dust sebum in a full scale washing machine using 48.3 L of water. The test was conducted using 1.3 g/l of commercially available liquid Wisk and 0.5 wt. Polymer based on weight of detergent. The test was conducted at 93° F., 80 rpm and 110 PPM hardness water. The wash was 20 minutes and was followed by a 3 minute rinse. The swatches were then dried and the L values of the swatches were measured using a Hunter calorimeter. Higher L values for the swatches indicate better detergency and that the stain is not being held on. The test results are summarized in Table IV.

TABLE IV

Evaluation of primary detergency properties.

| Stain | Average L value of stained swatch in the control | Average L value of stained swatch with polymer |
|---|---|---|
| Grass | 9.2 | 8.6 |
| Tea | 1.4 | 1.4 |
| Red Wine | 11.0 | 10.6 |
| Dust Sebum | 11.2 | 11.1 |

The test results in Table IV show that the quaternary polyvinylpyrridinium derivative of Example 3 does not adversely affect stain removal since the average L value of the stained swatches in the presence of the polymer are approximately the same as that of the control.

EXAMPLE 6

Synthesis of poly(sodium 2 acrylamido-2 methyl propane sulfonate (2-ACRYLAMIDO-2-METHYL-1-PROPANE SULFONIC ACID)-co-4 vinyl-1-ethyl-pyridinium bromide)

A mixture of 100 grams of deionized water and 100 grams isopropyl alcohol were taken in a reactor and heated to 80° C. The comonomers comprising 50 grams of 4-vinyl pyridine and 218.2 grams of a 50% solution of sodium 2-ACRYLAMIDO-2-METHYL-1-PROPANE SULFONIC ACID were fed to the reactor in separate feeds over a period of 1 hour. An initiator feed comprising of 1.5 grams of ammonium persulfate in 30 grams of deionized water was simultaneously added over a period of 1.5 hours. The reaction mixture was then held for 2 hours at 80° C. The reaction mixture was then cooled to 21° C. and 100 grams of the copolymer product were separated out for the quarternization reaction. Ethyl bromide, 10.3 grams, was added to the 100 grams of copolymer and heated to 80° C. for 17 hours. The dark product was distilled to remove the isopropyl alcohol. After cooling, the product was a clear dark brown solution with no undissolved solids.

EXAMPLE 7

A sample of poly(sodium 2 acrylamido-2 methyl propane sulfonate co-4 vinyl-1-ethyl-pyridinium bromide) synthesized in Example 6 was evaluated in the anti-dye transfer test described below.

The test involved washing 1 white cotton swatch with 4 swatches dyed with Direct Blue 1, 4 swatches dyed with Direct Blue 90, and 1 white cotton 400. These swatches are commercially available from Test Fabrics in New Jersey. The test was conducted in a terg-o-tometer using 1.3 g/l of Wisk liquid detergent and 1 weight percent polymer based on the weight of the detergent. The test was conducted at 93.4° F., 80 rpm and 110 PPM hardness water. The wash was 20 minutes and was followed by a 3 minute rinse. The swatches were then dried and the L values (whiteness) of the white swatches were measured using a Hunter calorimeter. A higher L value for the white swatch indicates that less dye is being transferred to the swatch and is a measure of the effectiveness of the dye transfer polymer. The test results are summarized in Table V.

TABLE V

Evaluation of dye transfer properties.

| Commercial liquid detergent composition | Quaternary polyvinylpyrridinium derivative | L value of white swatch |
|---|---|---|
| Wisk | None | 77.3 |
| Wisk | poly(sodium 2 acrylamido-2 methyl propane sulfonate)-co-4 vinyl-1-ethyl-pyridinium bromide) | 83.7 |

The results in Table V show that colored swatches washed in the detergent compositions containing the quaternary polyvinylpyrridinium derivative prepared in Example 6 were significantly whiter, as determined by the higher L values, than the swatches washed in the detergents without the polymer of the invention. Thus, the quaternary polyvinylpyrridinium derivatives prevent dyes which are present in the wash water from depositing on clothing.

EXAMPLE 8

Determination of whether the quaternary polyvinylpyrridinium derivatives such as the poly(sodium 2 acrylamido-2 methyl propane sulfonate)-co-4 vinyl-1-ethyl-pyridinium bromide) of Example 6 effect stain removal in a detergent composition.

A primary detergency test was conducted using a Blood/Milk/Ink (BMI) stain that was obtained from Test Fabrics. The test consisted on washing a BMI obtained swatch with 5 white swatches as ballast. These swatches are commercially available from Test Fabrics in New Jersey. The test was conducted in a terg-o-tometer using 1.3 g/l of commercially available liquid Wisk and 1.0 wt. Polymer based on weight of detergent. The test was conducted at 93° F., 80 rpm and 110 PPM hardness water. The wash was 20 minutes and was followed by a 3 minute rinse. The swatches were then dried and the L values of the BMI swatches were measured using a Hunter colorimeter. Higher L values for the BMI swatches indicate better detergency and that the stain is not being held on. The test results are summarized in Table VI.

TABLE VI

Evaluation of primary detergency properties.

| Polymer or Copolymer | Commercial detergent | L value of white swatch in primary detergency | L value of BMI swatch in primary detergency |
|---|---|---|---|
| None | Wisk liquid | 63.4 | 93.4 |
| poly(sodium 2 acrylamido-2 methyl propane sulfonate)-co-4 vinyl-1-ethyl-pyridinium bromide) | Wisk liquid | 62.7 | 93.4 |

The test results in Table VI show that the quaternary polyvinylpyrridinium derivative of Example 6 does not adversely affect stain removal since the L value of the BMI swatch in the presence of the polymer is approximately the same as that of the control. Furthermore, the L values of the white swatch indicate that the polymer and copolymer do not have an adverse effect on anti-redeposition properties since L value of the white swatch in the presence of the polymer is approximately the same as that of the control.

While the invention has been described with particular reference to certain embodiments thereof, it will be understood that changes and modifications may be made by those of ordinary skill in the art within the scope and spirit of the following claims.

What is claimed is:

1. A process for inhibiting dye transfer from one fabric to another during fabric laundering operations involving colored fabrics, said process comprises contacting fabrics with a laundering solution comprising a water-soluble quaternary polyvinylpyrridinium derivative comprising a quaternary nitrogen, said quaternary polyvinylpyrridinium derivative having the structure

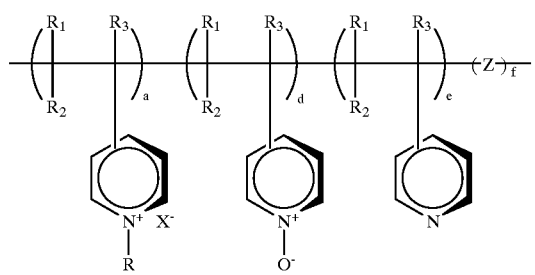

wherein a, d, e, and f represent the mole percent of the respective repeating unit, a is 1 to 100, d is 0 to 99, e is 0 to 99; f is 0 to 99; wherein said quaternary polyvinylpyrridinium derivative comprises one or more repeating units selected from the group consisting of an amine oxide (d), an unfunctionalized pyridine group (e) and another monomer (f), R is selected from the group consisting of substituted or unsubstituted $C_1$–$C_{18}$ alkyl, $C_1$–$C_{18}$ alkenyl, $C_1$–$C_{18}$ alkoxy, $C_1$–$C_{18}$ aryl, and benzyl; $R_1$, $R_2$, and $R_3$, are independently selected from the group consisting of hydrogen, hydroxyl, alkyl having $C_1$ to $C_{18}$, aryl having $C_6$ to $C_{18}$, and alkaryl having $C_7$ to $C_{18}$; $X^-$ is independently a halide.

* * * * *